INVENTORS.
HUGO KLINGELE
JOHN BOGART, JR.
BY
Leonard H. King
ATTORNEY.

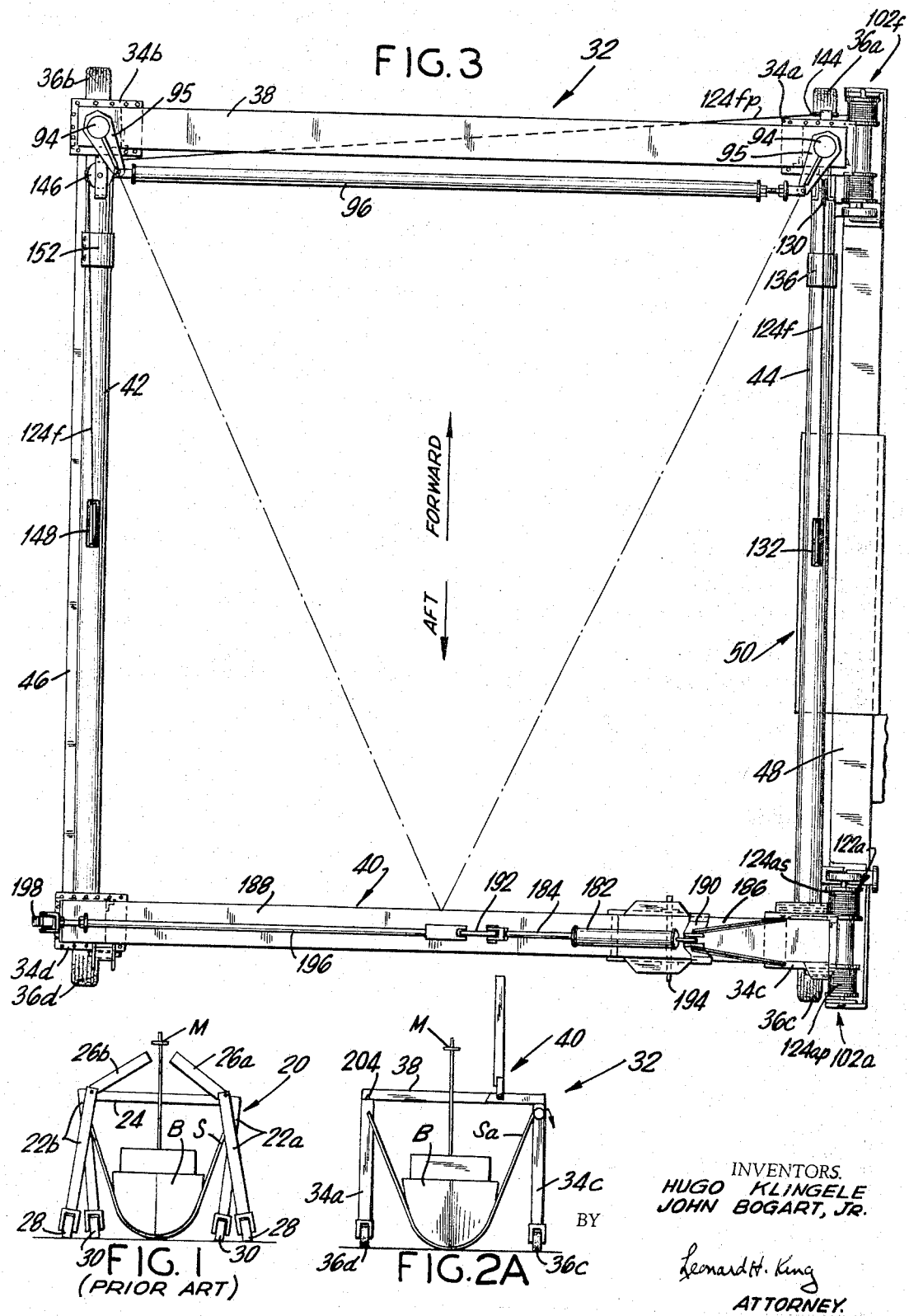

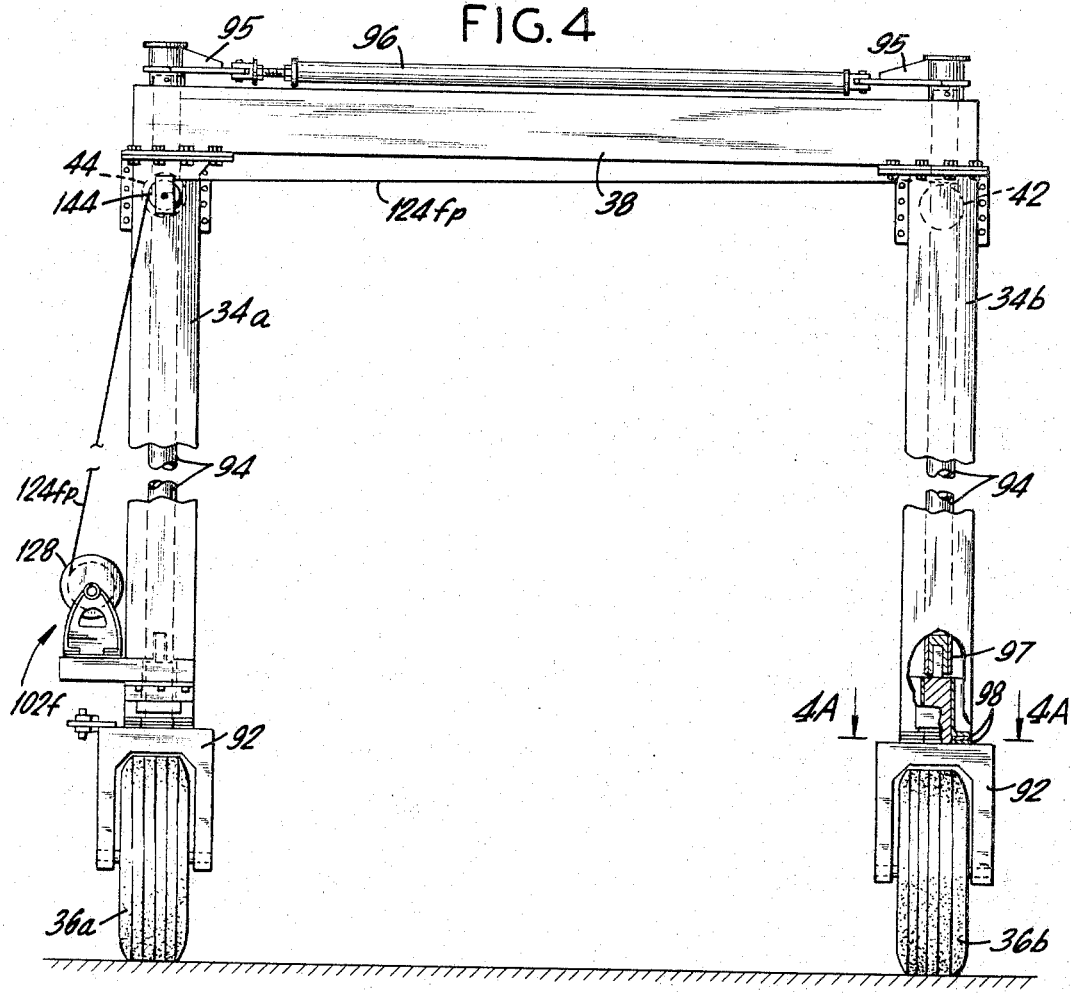
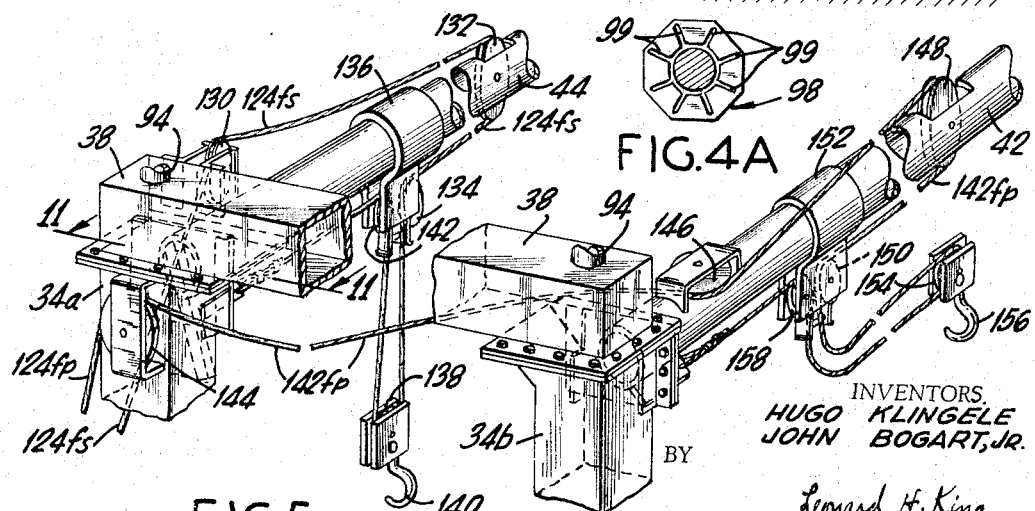

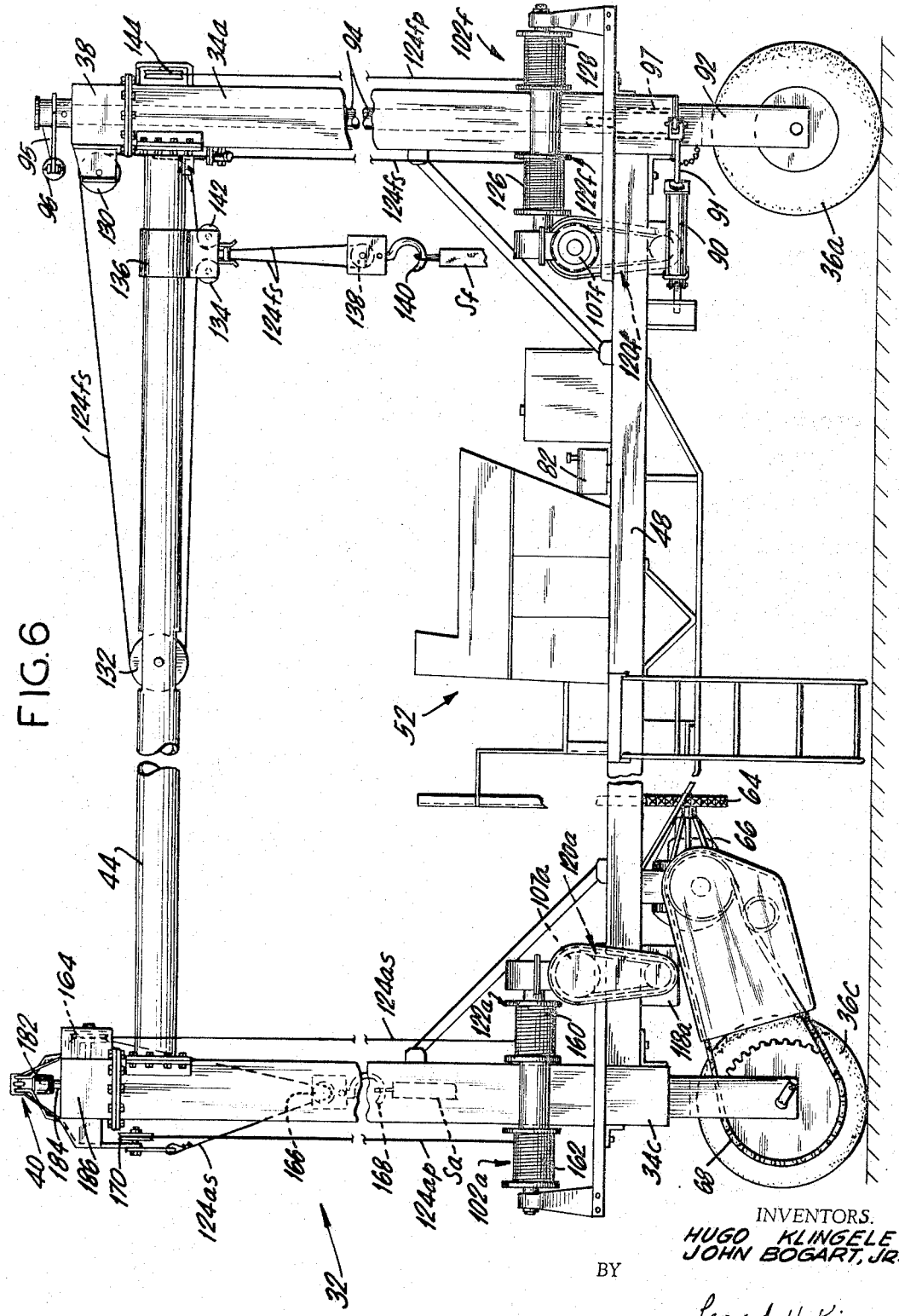

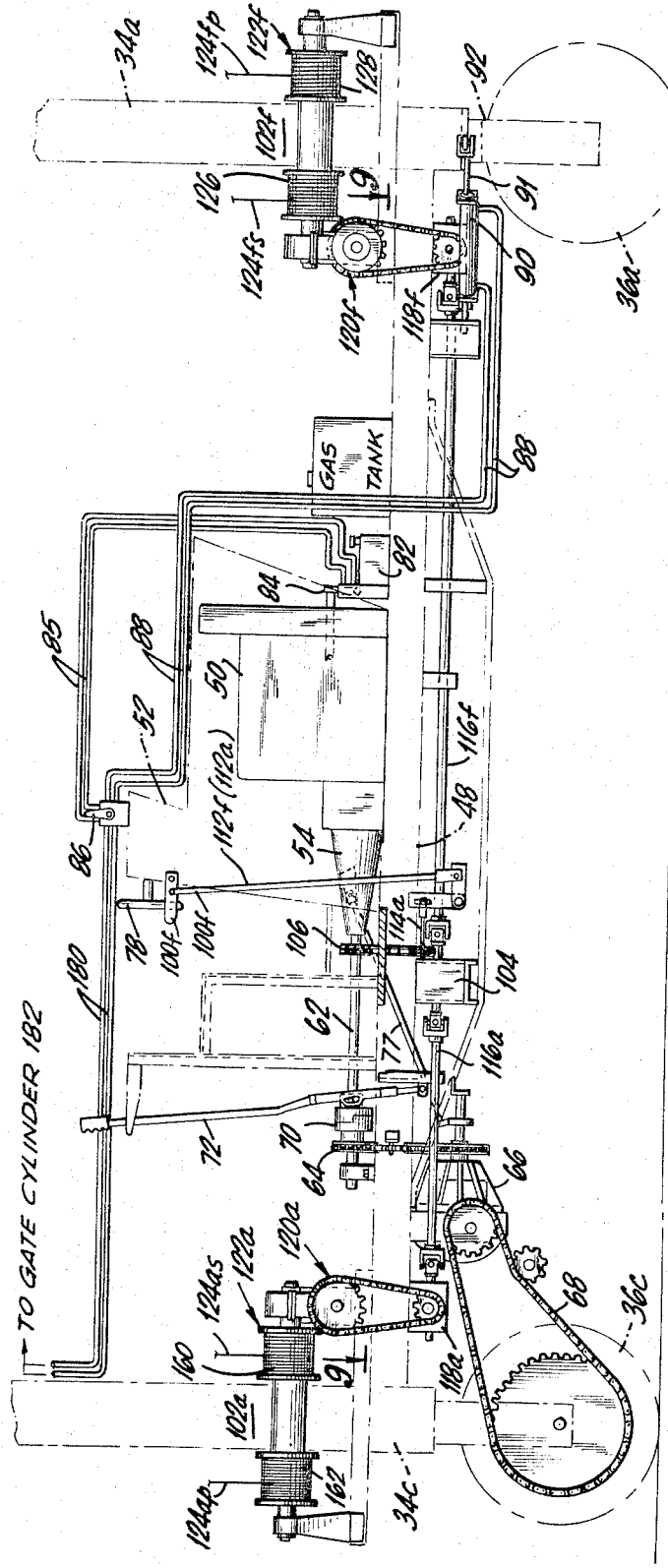

United States Patent Office 3,329,284
Patented July 4, 1967

3,329,284
MOBILE HOIST
John Bogart, Jr., Valley Stream, N.Y., and Hugo Klingele, 15 West Ave., Lawrence, N.Y. 11559; said Bogart assignor to said Klingele
Filed Dec. 27, 1965, Ser. No. 516,594
23 Claims. (Cl. 212—14)

ABSTRACT OF THE DISCLOSURE

A self-propelled, knocked down, load-carrying apparatus wth an open end gate arrangement.

This invention relates to self-propelled hoists and more particularly but not limited to an improved, mobile marine hoist.

Hoists are commonly used in marinas to remove boats from the water, place the boats on shore for repair and storage, and to replace the boats in the water. Marine hoists are also used for transporting boats from one location to another over relatively short land distances. In order to be practical from both economy and efficiency standpoints, the hoist should be able to easily handle a wide range of boat sizes. While the present invention was conceived to primarily perform the functions mentioned above, it will be appreciated that the apparatus, when provided with suitable slings or other holding means, could be used for transporting heavy machinery or other bulky loads over land from one point to another.

Self-propelled machines of the aforementioned type are old in the art. However, prior devices have been excessively costly, difficult to operate and maneuver, difficult and expensive to service and maintain, as well as inefficient with loads that are very large in size and/or weight. In many cases one form of propulsion means was used for the machine and other means, usually costly electric motor drives, were used to operate the hoisting mechanism.

Prior art devices generally suffered several other drawbacks. First, when a gate was included in the hoist frame to accommodate sailboats, for example, there was a definite tendency for the frame to twist when the gate was opened due to its own mass. Accordingly, it was very difficult and time-consuming to reclose the gate because the movable member was out of position. Second, since shipping costs are minimized by transporting the huge hoists in a knocked down condition, there is considerable assembly time required by the prior art devices. Usually, the services of a highly skilled and trained crew are needed for three or four days to complete the assembly.

By way of contrast, the present invention provides simpled and low cost apparatus that is highly mobile and easily maneuverable. Because the power system is comprised primarily of automotive components, it may be serviced by any competent automobile mechanic without the need for additional or specialized training. A unique feature of the instant invention is the use of a single, internal combustion plant to move the apparatus as well as operate the hoisting means. All the power components, i.e., engine, driving, steering, and hoisting mechanisms, as well as the controls therefor, are mounted on one power sled. They are set up and preadjusted at the factory thus greatly simplifying field assembly.

The structural components of the present invention contribute to improved performance of the apparatus, particularly where sport fisherman boats with a flying bridge or tall masted sailboats are to be transported. The two end frames are of box girder construction, one of which is provided with a pivotal gate. In order to prevent the buckling of the end frames, as was prevalent with the prior art devices when the gate was open, a torsion bar effect is provided by at least one of the longitudinal connecting members between the end frames.

In the present invention the controls for all of the operations are conveniently located in one place in the operator's cab. For maximum visibility and safety, the cab is positioned relatively close to the ground intermediate the end frames. Thus no tall ladders need be climbed. The drive for the instant apparatus is mechanical thus assuring positive control especially when the terrain is uneven. The fore and aft winches are also mechanically actuated to assure smooth, rapid lifting while the pivotal gate and the steering means are hydraulically actuated. Because of the construction of the present invention, it may be shipped knocked-down, but in contrast to the prior art devices, requires only one trained man for reassembly plus the assistance of local unskilled labor. In addition, assembly time is in the order of eight hours as compared to three or four days with prior art devices.

Accordingly, it is an object of the present invention to provide an improved marine hoist that may be shipped knocked-down and then field-assembled in a minimum of time.

Another object is to provide an improved marine hoist that may be field-assembled with a minimum of skilled labor.

A further object is to provide an improved marine hoist that may be serviced by techniques, apparatus and personnel that are conventional in the automative industry.

A particular object of this invention is to provide an improved, self-propelled marine hoist.

An additional object is to provide a marine hoist having an improved drive means.

Yet another object is to provide a single, internal combustion engine type power system for both propulsion means and hoisting means.

A feature of this invention is that the apparatus may be serviced by well known automotive techniques.

A further object is to provide a marine hoist having an improved frame construction.

Another object is to provide an improved gate for a marine hoist.

A particular feature of this invention is that the power equipment and the controls therefor are located on a single sled.

Another feature of this invention is that improved steering is provided with the use of only one hydraulic cylinder.

These and other features, objects and advantages of the invention will, in part, be pointed out with particularly and will, in part, become obvious from the following more detailed description of the invention taken in conjunction with the accompanying drawing which forms an integral part thereof.

In the various figures of the drawing like reference characters designate like parts.

In the drawing:

FIG. 1 is a schematic front elevational view of a typical prior art machine hoist illustrating a common problem encountered when the gate is opened;

FIG. 2A is a schematic front elevational view of the present invention with the gate open;

FIG. 3 is a plan view of the apparatus comprising the improved marine hoist;

FIG. 4 is a fragmentary end elevational view with a portion broken away;

FIG. 4A is a plan view, taken along line 4A—4A of

Figure 10:
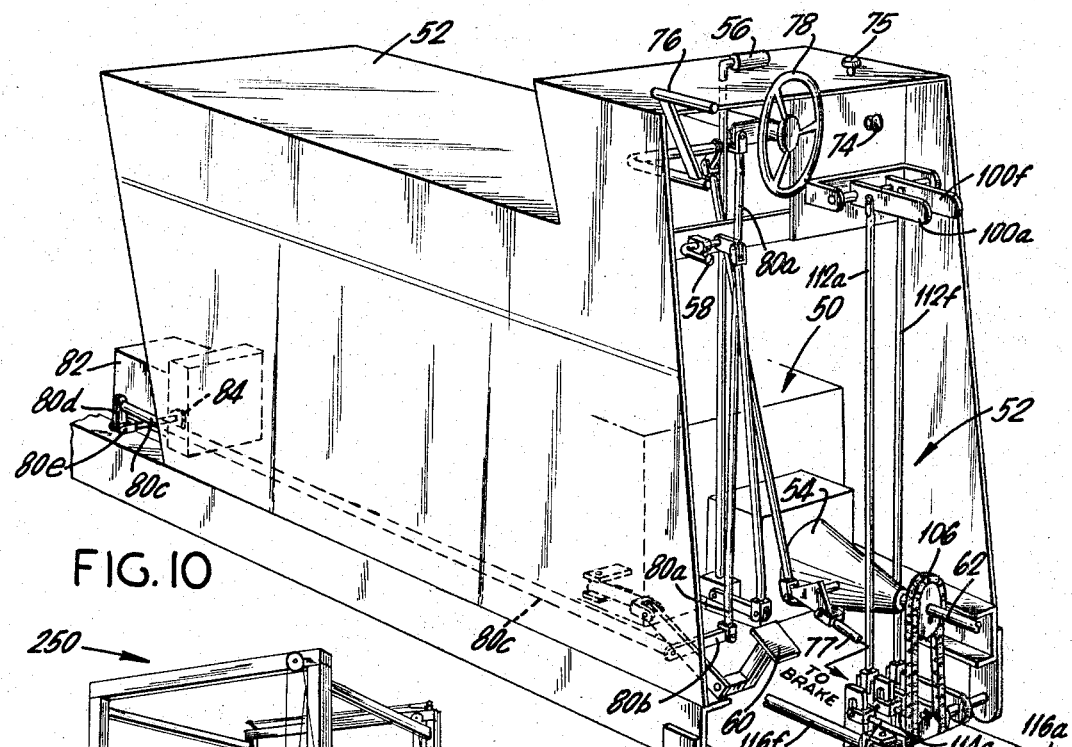
Figure 14:
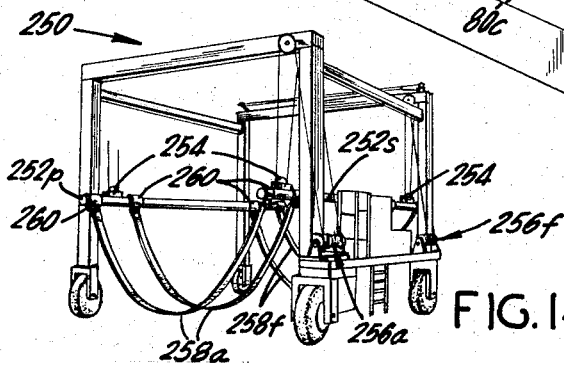
Figure 7:
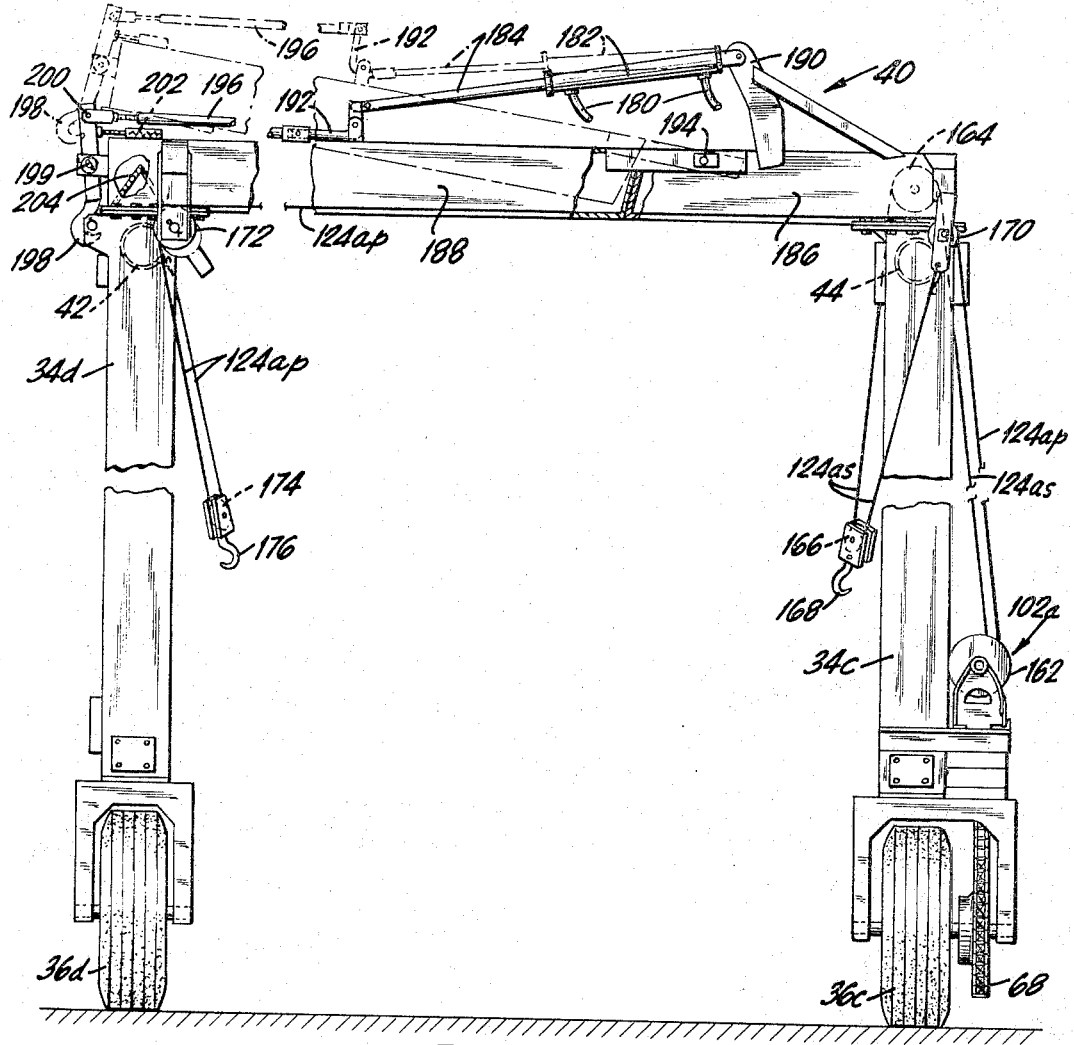
Figures 12, 13:
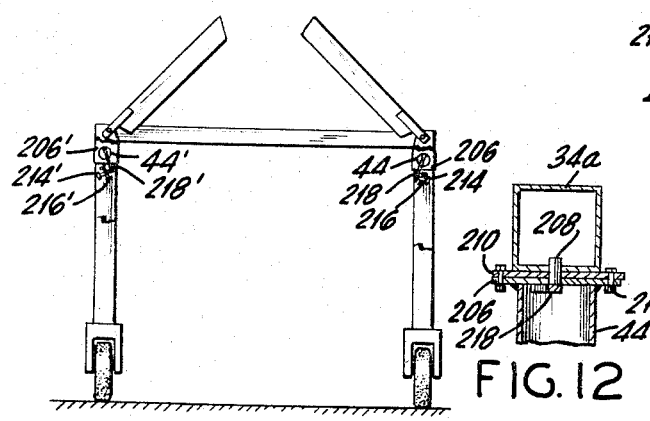
Figure 11:
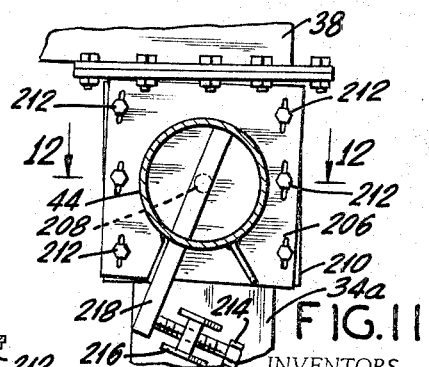

FIG. 4 illustrating several components on an enlarged scale;

FIG. 5 is a fragmentary, perspective view of a portion of the hoisting mechanism positioned at the top of the the frame at one end thereof;

FIG. 6 is a fragmentary side elevational view of the present invention;

FIG. 7 is a fragmentary end elevational view opposite to that of FIG. 4 illustrating the gate actuating mechanism;

FIG. 8 is a side elevational view schematically illustrating the drive system of the present invention;

FIG. 9 is a schematic plan view of the showing made in FIG. 8 and taken along line 9—9 of FIG. 8;

FIG. 10 is a perspective view of the operator's cab showing the location and relationship of the various controls used in driving the hoist, the winches, and the gate;

FIG. 11 is a sectional plan view taken along line 11—11 of FIG. 5;

FIG. 12 is a cross sectional view taken along line 12—12 of FIG. 11;

FIG. 13 is a schematic end elevational view of an alternative embodiment employing a double acting gate; and FIG. 14 is a pictorial view illustrating improved sling means that may be used in combination with this invention.

Referring now to the drawing, a typical example of prior art devices is illustrated in FIG. 1. Hoist 20 is comprised of side frame members 22a and 22b, a rear cross member 24, and a front cross member in the form of a sectional gate consisting of pivotal members 26a and 26b. Fore and aft sets of wheels 28 and 30, respectively, provide mobility for the hoist which, by opening the gate, can lift a boat B having a tall mast M. Generally the boat is supported in fore and aft slings S controlled by winches (not shown).

It has been found that when the gate is opened there is a tendency for the side frames to twist. While this condition is particularly prevalent where the terrain is uneven, it can and does occur even on level ground. The hoists required for the bigger boats are so large themselves and so heavy that once the gate is opened and the front cross beam no longer opposes the forces of the side frames, the mass of the structure will cause the misalignment shown in somewhat exaggerated form in FIG. 1. When this does happen it is difficult and sometimes impossible (without auxiliary equipment) to reclose the gate.

Figure 2B:
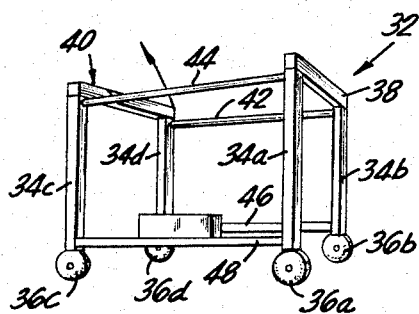
FIG. 2B is a perspective view schematically illustrating the major components of the instant invention.
Figure 2C:
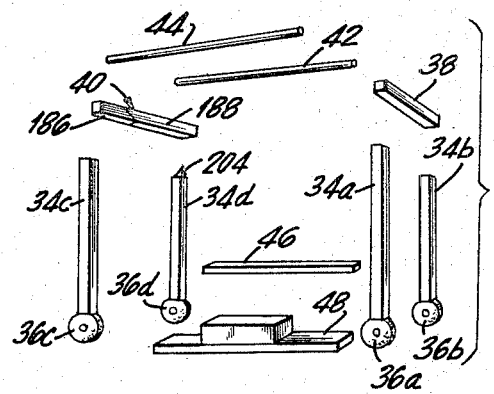
FIG. 2C is an exploded, perspective view schematically illustrating the components shown in FIG. 2B.

The misalignment problem is one of several that are overcome by the novel structure now to be described. The major components of the present invention are schematically shown in FIG. 2A and FIG. 2B. Basically the hoist 32 is comprised of four upright corner posts 34a–34d fabricated by abutting two U-beams, to form box girders. Each post is supported by wheels and aircraft type tires 36a–36d, respectively, with wheels 36a and 36b being driven and steerable. Wheels 36c and 36d are not steerable but do the driving. The two forward posts are joined to each other by a one-piece cross member 38 and the two rear posts are joined to each other by the two-piece gate member 40. Elongated tubes 42 and 44, at least one of which is arranged to provide torsional forces, join the port and starboard side posts, respectively, proximate the top thereof. Beams 48 and 46 join the port and starboard side posts, respectively, proximate the bottom thereof. Beam 48 carries substantially all of the mechanical components and is removable as a subassembly together with the equipment mounted thereon. In FIG. 2C there are shown the major components in exploded form representing the basic subassemblies in condition for knocked-down shipment. All linkages and mechanisms to be hereinafter described are designed such that they may be used outdoors in inclement weather and a salt corrosive atmosphere. Therefore they are rugged in design and easily maintained.

I.—Propulsion

The hoist is propelled by means of a conventional internal combustion engine 50 mounted just forward of the operator's cab 52 on the starboard beam 48. By way of example, a Chrysler 6 cylinder, L-head engine delivering approximately 190 ft. lbs. of torque at 1600 r.p.m. has been found to be more than adequate. A transmission 54 is also included to provide the operator with a selection of gear ratios between the engine and the driving wheel. As will be brought out more fully hereinafter, transmission 54 may also be used to provide a selection of lifting speeds for the winches. First lever 56 (FIG. 10), positioned at the front of the cab, permits the selection of either forward, neutral or reverse positions of the transmission while second lever 58 permits selection of either of two higher gear ratios. Suitable linkages connect the levers 56 and 58 to a standard transmission which, because it is so well known, need not be discussed in greater detail.

A clutch pedal 60 in the operator's cab provides that the driving members rotating with the engine may be selectively connected and disconnected from the driven members rotating with the power transmission system. This is done for two reasons. The first reason is to permit the gears in the transmission to be shifted from one ratio to another without clashing. The second reason is to permit the engine to operate for a short time without a load until it develops enough torque to overcome the inertia of the vehicle at rest. Since the clutch assembly is also conventional in the automotive arts, its specific construction will not be described in detail.

Transmission 54 is connected to wheel 36c by means of a drive shaft 62, a sprocket, and chain arrangement 64, driven by the shaft and a combination right angle drive and reducing gear assembly 66 made by modifying a standard automotive differential. The right angle drive assembly is, in turn, connected to the driving wheel by means of another sprocket and chain arrangement 68. For purposes to be described later, drive shaft 62 is provided with a coupling member 70 that is actuated by lever 72. With the drive shaft coupled to the chain and sprocket arrangement 64, as shown in FIG. 8, the power train is complete and the hoist is ready to be driven.

The engine is started by means of a conventional ignition system actuated by key 74 on the control panel of the operator's cab. With the engine running, clutch pedal 60 is depressed to disengage the clutch allowing the gears to be shifted, lever 72 is moved to couple the drive shaft to the driving wheel, as described above, and lever 56 is moved to the "forward" position. By slowly releasing the clutch pedal, the torque developed by the engine will be supplied to the driving wheel through the aforementioned components. The machine will move forward at approximately 2 m.p.h. To achieve a speed of approximately 6 m.p.h. range control lever 58 is moved from its original "low" setting by depressing the clutch pedal and by moving lever 56 to the "reverse" position. A speed of approximately 2 m.p.h. can be attained. A higher reverse speed can be achieved by setting hand throttle 75 on the control panel to increase the engine r.p.m. Brake handle 76, located in the operator's cab, is connected by suitable linkages 77 to the shaft of the combination, right angle drive and speed reducer 66 to provide means for stopping the machine.

II.—Steering

Steering of the hoist is done hydraulically. Hand wheel 78, located in the operator's cab, is connected by suitable linkages 80a–80e to a pump 82 having a pressure spool valve 84 and conduits 85. Movement of the hand wheel to either the right or left causes an appropriate response in the by-pass valve. By setting a selector valve 86 (FIG. 8) to "steering" hydraulic fluid is delivered through conduits 88 to cylinder 90. The piston 91 of the cylinder is linked to one of the two yokes 92 on which the forward wheels are mounted. Wheels 36a and 36b are caused to move in unison by means of tubular posts 94 extending upwardly through box girders 34a and 34b steering arms 95 rigidly secured at the upper end of each post and the tie rod 96 linking the free end of the steering arms.

Proper steering geometry is achieved by aligning each steering arm with the theoretical midpoint of the machine at the aft end. This is shown schematically in FIG. 3. The position of the steering arms depends on the length of the hoist which may be between 18 and 24 feet. Therefore, the length of the rod is adjustable. By properly locating the steering arms, excessive wear on the tires is avoided. Smooth and efficient steering is assured by a sleeve bearing 97 that is provided where each yoke enters the vertical column. In addition, washers 98, having a plurality of grease retaining grooves 99 are also included. These features may be seen in FIG. 4 and FIG. 4A.

III.—Lifting

As mentioned previously, the lifting mechanism is driven by the same engine that propels the machine. All gears can be used for this purpose. While the lifting mechanism can be operated at slow speed while the hoist is mobile, this is not the usual procedure. It is safer to wait until the hoist is stationary before raising and lowering the slings. Accordingly, the hoisting mechanism will now be described under the latter conditions.

First, the drive shaft 62 is disconnected from the driving wheels by moving lever 72. This uncouples member 70. Then, with the range control lever 58 set at the "low" position, clutch pedal 60 is depressed and lever 56 is placed in the position marked "reverse."

Winch control levers 100f and 100a are located in the operator's cab proximate the hand wheel. Lever 100f controls the up and down movement of the forward winch 102f while lever 100a controls the up and down movement of the aft winch 102a.

A power divider 104, secured beneath starboard beam 48 and having neutral, reverse, and forward positions, is driven through a chain and sprocket arrangement 106 by the engine 50 and the transmission 54. It should be noted at this time that, even though the engine is running, the hoist is not mobile because the coupling 70 has disconnected the driving wheels from the power train. In order to insure that the loaded slings do not inadvertently lower when the power is off, fore and aft brakes 107f and 107a, respectively, are included. Suitable brakes for this purpose are manufactured and supplied integrally with the winches. As may be seen in FIG. 9, a transverse shaft 108 is mounted on the hoist and a hollow sleeve 110 is placed thereover. Linkage 112f connects forward winch control lever 100f to shaft 108 and linkage 112a connects aft winch control lever 100a to sleeve 110. Rod 114f connects shaft 108 to the transfer mechanism, while rod 114a connects the sleeve 110 to the transfer mechanism. Thus by moving either winch control lever either upward or downward, the forward or reverse gear positions of the transfer mechanism may be selected. The neutral position is utilized when the winches are not lifting.

Upon selection of the proper winch and winch direction, the engine's power is transmitted from the transfer device to the appropriate drive shaft 116f or 116a. By means of right angle drives 118f and 118a, sprocket and chain assemblies 120f and 120a are driven to rotate the winch drums 122f and 122a. The hoisting cables 124f and 124a, which have a hemp center, are wound on the drums.

For an understanding of the rigging used with the forward sling Sf, reference may be had to FIGS. 3, 4, 5, and 6. Winch drum 122f is in two separate cylindrical sections 126 and 128, each adapted to accommodate a length of the cable 124f. From winch section 126, the cable 124fs is first trained about a pulley 130 rotatably journaled at the top of column 34a, about pulley 132 rotatably journaled in tube 44, and then about a smaller pulley 134 carried by bracket 136 slidably positionable on tube 44. The cable then goes about another pulley 138 integral with the hook 140 that supports the starboard side of sling Sf. Finally, cable 124fs traverses a second pulley 142 in bracket 136 and is anchored at a convenient point on column 34a.

The port side of cable 124fp starts at winch drum section 128, is trained about pulley 144 journaled in the top of column 34a, traverses the machine below cross member 38, and is successively trained about pulley 146 journaled in the top of column 34b and pulley 148 journaled in tube 42. Cable 124fp then traverses a first, small pulley 150 journaled in bracket 152 slidably mounted on tube 42, is trained about pulley 154 integral with the hook 156 that supports the port side of sling Sf and is trained about a second, small pulley 158 in the bracket 152. Finally, the cable is suitably anchored in column 34b.

The rigging of the aft cable 124as will be understood by reference to FIGS. 6 and 7. Winch drum 122a is in two separate cylindrical sections 160 and 162, each adapted to accommodate a length of the cable 124as. From winch section 160, the cable traverses a pulley 164 journaled in the fixed section of gate 40. The cable then traverses a pulley 166 integral with the hook 168 that supports the starboard side of sling Sa and is subsequently anchored on column 34c.

The port side of cable 124ap starts at winch drum section 162, is trained about pulley 170 journaled at the top of column 34c, traverses gate 40 and then is trained about pulley 172 journaled in column 34d proximate the top thereof. The cable then travels downwardly, goes about pulley 174 integral with the hook member 176 that supports the port side of sling Sa, and is suitably anchored in column 34d.

It should be noted that almost all of the pulleys are located on the outside corners of the machine so that when a boat is being transported, the weight thereof is proportionally distributed to the load-bearing columns. It is also a particular feature, particularly in the aft end, that the cable pulleys are below the hinge line of the gate. This construction aids in holding the gate down in its closed position when a boat is being carried.

IV.—Gate

Operation of gate 40 is accomplished by setting the selector valve 86 at the "gate" position. This action permits pump 82 to send hydraulic fluid through conduits 180 to hydraulic gate cylinder 182 to actuate the piston 184 thereof. As may best be seen in FIG. 7, the gate is comprised of a short fixed section 186 and a longer, hinged section 188. The gate cylinder is pivotally mounted on bracket 190 secured to the fixed section of the gate. Piston 184 is in turn pivotally connected to one end of a bell crank type arm 192 secured to longer section 188 so that the movable portion of the gate may be pivoted about hinge pin 194.

Adjustable linkage 196 is secured to the opposite end of the bell crank. Hook member 198, which is pivotally mounted at 199 on the outside end of the long gate section is in turn secured by means of pivot pin 200 to the free end of linkage 196. There is also included a spring member 202 that tends to bias hook member 198 in a counterclockwise direction. Thus a positive engagement between the hook and the latching pin is assured when the gate is closed. Still another structural feature is provided by the cone-shaped piloting member 204 integral with the top of post 34d. A similarly shaped opening is provided in gate member 188 so that when the gate is approaching the fully closed position it will be accurately guided. It should be noted at this time that the full length of the piston stroke is approximately 30 inches in the embodiment illustrated. However, only 26 inches are utilized to open and close the gate. The remaining 4 inches are utilized to provide an overtravel when closing so that positive locking takes place. The aforementioned spring arrangement provides positive mechanical locking in the event of hydraulic leak down or seepage which is inherent in all hydraulic systems.

As mentioned previously, there has been a tendency in the prior art devices for the frame to twist when the gate was opened. While this cannot be eliminated due to weight of the hoist members, the deleterious effect has been overcome in the present invention by the novel use of a torsion bar effect. Reference may be had to FIGS. 5, 11, and 12 for a full understanding of this feature.

One end of tube 44 has a plate 206 and an axially extending locating stud 208 secured thereto. The stud is disposed in an aperture in plate 210 fixed on the top of column 34a. Bolts 212, passing through oversized clearance holes in plate 206 and engaged in threaded bores in plate 210, secure the tube to the column. The machine is fully erected in the field except for the bolts holding the opposed torque tube and column plates. The gate is then opened and when the aft columns toe in (as schematically shown in FIG. 1) the torque tube is prestressed.

The torque tube is prestressed by means of turning a bolt 214 threadably engaged in a bracket 216 that is integral with column 34d. The force is exerted on lever 218 which extends radially through the tube and the twist that is imparted to the length of the tube is in the opposite direction to that in which the column would tend to move when the gate is opened. FIG. 11 is viewed from the inside of the machine looking towards the forward end. The top of the aft column on the starboard side (not shown) would normally tend to move to the left in a counterclockwise direction when the gate is open. Therefore, threading the bolt 214 forward would twist lever 218 and tube 44 in a clockwise direction to balance the normal forces on the aft column. Thus the gate may be opened and the column remains upright because a moment arm is created in a clockwise direction balancing the counterclockwise moment imparted to the torque tube by the weight of the structure. The lever arrangement tends to restore the tube to its original untwisted condition. Once the torque tube is properly prestressed during the preliminary assembly described above, the plates are rigidly secured to each other by bolts 212. While the torsion bar effect has been described in connection with only one tube, it is evident that it could just as well be applied to both tubes, particularly where the gate is "double-acting" as shown in FIG. 13. Therein prime reference characters denote similarly functioning parts.

Still another combination available with the present invention is illustrated in FIG. 14. The mobile hoist is generally denoted by the reference character 250 and may be either the solid frame type or it may have either the single or double acting gate arrangement previously described. The propulsion means, steering means, lifting means, and gate arrangement are all the same as in the prior embodiments. However, as will now be explained, an improved sling arrangement is provided.

Starboard and port hanger tubes 252s and 252p, respectively, each have a fore and aft pulley 254 journaled thereon. Fore and aft cables are trained about these and other pulleys so that winches 256f and 256a may raise and lower the hanger tubes as desired. Slings 258f and 258a are secured to sleeves 260 that are slidably mounted on the tubes. Optionally, fixed positioned slings may be secured at each end of the hanger tubes. The advantage of this system is that the tubes are extremely strong and yet not excessively heavy and also the movable slings are adjustably positionable along the length of the tubes in accordance with the weight distribution of the object being lifted.

The apparatus shown and described provides an improved marine hoist that overcomes many vexing problems inherent in prior art devices. By providing the torsion bar effect, the gate may be easily opened and closed when it is necessary to transport large boats. The operator has the assurance that the frame will not twist out of shape to prevent closing thereof. An additional feature is that the construction permits knocked-down shipment and field assembly at a point that may be quite remote from where the hoist was actually fabricated. Assembly costs are kept down since only one man from the factory, in addition to local unskilled labor, is required to assemble the hoist. The assembly is done in a minimum of time.

Surprisingly, only 1½ to 2 full turns of the torsion-applying bolt is all that is required to sufficiently load the torque tube and to return the column to its correct vertical position. The column will remain vertical regardless of how many times the gate is opened because the torque tube does not take a permanent set and always tends to supply a restoring force. To fully appreciate the ease with which the torque tube may be twisted, typical dimensions of the active components are given. The tube is 18 to 24 feet long, has approximately an 8⅝ inch diameter with a wall thickness of 5/16–⅜ inch. The torsion-applying bolt has a 1⅛ or 1¼ inch thread diameter with 7 threads per inch and acts against twisting lever at a point approximately 16 inches away from the centrally positioned locating stud.

It is important to note that substantially the entire power plant is comprised of conventional automotive parts. Therefore, maintenance and servicing costs are materially reduced. In addition, the same power plant that propels the hoist is also used to provide lifting power. The steering and gate-operating forces are hydraulically driven from the main power plant to even further simplify maintenance and to assure a long trouble-free life of service at a low cost.

Having thus disclosed the best embodiment of the invention presently contemplated, it is to be understood that various changes and modifications may be made by those skilled in the art without departing from the spirit of the invention.

What is claimed is:
1. An improved mobile hoist comprising:
(a) fore and aft frame members, each said frame member comprising a pair of spaced vertical columns and a tranverse connecting member extending between the upper ends of said columns, one of said connecting members being hinged proximate at least one end thereof and openable to define a gate, the lower end of each of said columns including a wheel adapted to rollably support said hoist on the ground;
(b) actuating means arranged to open and close said gate;
(c) elongated port and starboard beam members extending between and rigidly secured to said vertical columns;
(d) a power plant including driving and steering control means, said power plant being mounted on one of said beam members and adapted to propel said hoist;
(e) elongated port and starboard spacer means extending between said vertical columns at the upper ends thereof, at least one of said spacer means being angularly twisted about the longitudinal axis thereof whereby torsional forces are imparted to said vertical column of said openable frame member in the closed condition adjacent said twisted spacer means, misalignment of said openable frame member being thereby prevented when said gate is open; and
(f) load manipulating means carried by said hoist.
2. The apparatus in accordance with claim 1 wherein said gate-actuating means is an hydraulic cylinder having a displaceable piston connected to said gate and wherein the displacement of said piston is greater than is required to close said gate, the excess piston travel being utilized to positively lock said gate.
3. The apparatus in accordance with claim 1 wherein said gate is hingedly mounted proximate one end thereof to define a side-opening gate, wherein the upper end of said vertical column proximate the free end of said gate includes a tapered extension and wherein the underside of said gate includes an aperture adapted to register with said tapered column extension during the closing of said gate.

4. An improved mobile hoist comprising:
(a) fore and aft frame members, each said frame member comprising a pair of spaced vertical columns and a transverse connecting member extending between the upper ends of said columns, one of said connecting members being hinged proximate at least one end thereof and openable to define a gate, the lower end of each of said columns including a wheel adapted to rollably support said hoist on the ground;
(b) actuating means arranged to open and close said gate;
(c) elongated port and starboard beam members extending between and rigidly secured to said vertical columns;
(d) a power plant including driving and steering control means, said power plant being mounted on one of said beam members and adapted to propel said hoist;
(e) elongated port and starboard spacer means extending between said vertical columns at the upper ends thereof, at least one of said spacer means being angularly twisted about the longitudinal axis thereof whereby torsional forces are imparted to said vertical column of said openable frame member in the closed condition adjacent said twisted spacer means, misalignment of said openable frame member being thereby prevented when said gate is open, wherein at least one of said spacer means is tubular, there being a radially extending member integrally secured at one end of said tubular spacer member, adjustment means mounted on said column adjacent said tubular spacer means end, said adjustment means being arranged to angularly displace said radially extending member and means to secure said tubular spacer means end to said adjacent column subsequent to the angular displacement of said radially extending member; and
(f) load manipulating means carried by said hoist.

5. The apparatus in accordance with claim 4 wherein said radially extending member is a lever and wherein said adjustment means is comprised of a bracket secured to said column adjacent said tubular spacer means end and a bolt threadably disposed in said bracket, said bolt being in abutment with said lever whereby turning said bolt will angularly displace said lever and impart a torsional force to said tubular spacer means.

6. The apparatus in accordance with claim 5 wherein said means to secure said tubular spacer means to said adjacent column comprises a first plate integral with said tubular spacer means end, a second plate integral with said adjacent column, and a plurality of bolts extending through and clamping together both said first and second plates.

7. An improved mobile hoist comprising:
(a) fore and aft frame members, each said frame member comprising a pair of spaced vertical columns and a transverse connecting member extending between the upper ends of said columns, one of said connecting members being hinged proximate at least one end thereof and openable to define a gate, the lower end of each of said columns including a wheel adapted to rollably support said hoist on the ground;
(b) actuating means arranged to open and close said gate;
(c) elongated port and starboard beam members extending between and rigidly secured to said vertical columns;
(d) a power plant including driving and steering control means, said power plant being mounted on one of said beam members and adapted to propel said hoist;
(e) elongated port and starboard spacer means extending between said vertical columns at the upper ends thereof, at least one of said spacer means being angularly twisted about the longitudinal axis thereof whereby torsional forces are imparted to said vertical column of said openable frame member in the closed condition adjacent said twisted spacer means, misalignment of said openable frame member being thereby prevented when said gate is open, wherein both of said spacer means are tubular and each includes an integrally secured, radially extending member at one end thereof, port and starboard adjustment means mounted on said columns adjacent said spacer means ends, said adjustment means being arranged to angularly displace said radially extending members and means to secure said spacer means ends to said adjacent columns subsequent to the angular displacement of said radially extending members; and
(f) load manipulating means carried by said hoist.

8. The apparatus in accordance with claim 7 wherein said radially extending members are levers and wherein said adjustment means are comprised of port and starboard brackets secured to said respective columns adjacent said spacer means ends and a bolt threadably disposed in each of said brackets, said bolts being in abutment with said respective levers whereby turning said bolts will angularly displace said levers and impart a torsional force to each of said spacer means.

9. The apparatus in accordance with claim 8 wherein said means to secure said spacer means to said adjacent column comprises a first plate integral with each said spacer means end, a second plate integral with each said column, and a plurality of bolts extending through and clamping together both said respective first and second plates.

10. An improved mobile hoist comprising:
(a) fore and aft frame members, each said frame member comprising a pair of spaced vertical columns and a transverse connecting member extending between the upper ends of said columns, one of said connecting members being hinged proximate at least one end thereof and openable to define a gate, the lower end of each of said columns including a wheel adapted to rollably support said hoist on the ground;
(b) actuating means arranged to open and close said gate;
(c) elongated port and starboard beam members extending between and rigidly secured to said vertical columns;
(d) a power plant including driving and steering control means, said power plant being mounted on one of said beam members and adapted to propel said hoist;
(e) elongated port and starboard spacer means extending between said vertical columns at the upper ends thereof, at least one of said spacer means being angularly twisted about the longitudinal axis thereof whereby torsional forces are imparted to said vertical column of said openable frame member in the closed condition adjacent said twisted spacer means, misalignment of said openable frame member being thereby prevented when said gate is open; and
(f) load manipulating means carried by said hoist, wherein said load manipulating means comprises:
(1) power divider secured to one of said beam members;

(2) means to drivingly interconnect said power plant and said power divider;

(3) first and second drive shafts extending from and rotatably driven by said power divider, one of said drive shafts terminating proximate the fore end of said hoist the other of said drive shafts terminating proximate the aft end of said hoist;

(4) linkage means connected to said power divider and arranged to select either of said first and second drive shafts for rotation by said power plant;

(5) fore and aft right angle drive means connected to the ends of said respective drive shafts;

(6) fore and aft winches each having port and starboard drums, said winches being mounted on one of said beam members;

(7) means to drivingly interconnect said respective drive shafts and winches;

(8) lengths of port and starboard cables wound about said respective port and starboard drums of said fore and aft winches; and (9) fore and aft slings secured respectively to the port and starboard sides of said fore and aft winch cables.

11. The apparatus in accordance with claim 10 including brake means integral with each of said winches.

12. The apparatus in accordance with claim 10 including elongated port and starboard hanger tubes secured respectively to said port and starboard cables of said fore and aft winches, said port and starboard sides of said fore and aft slings being secured to said port and starboard hanger tubes.

13. The apparatus in accordance with claim 12 wherein said fore and aft slings are slidably adjustable along the length of said fore and aft hanger tubes.

14. In a mobile hoist having an openable gate adjacent at least one end thereof, port and starboard beam members spacing fore and aft upright frame members from each other, means to propel the hoist and means to raise and lower the load carried by the hoist, that improvement therein which comprises:

(a) elongated port and starboard spacer means extending between the upright frame members wherein at least one of said spacer means is tubular, there being a radially extending member integrally secured at one end of said tubular spacer means, adjustment means mounted on the upright frame member adjacent said tubular spacer means end, said adjustment means being arranged to angularly displace said radially extending member and means to secure said tubular spacer means end to the adjacent frame member subsequent to the angular displacement of said radially extending member; and (b) means to apply a torsional force to at least one of said spacer means, the torsional force being in opposition to the force normally imparted to the spacer means when the gate is open.

15. The apparatus in accordance with claim 14 wherein said radially extending member is a lever and wherein said adjustment means is comprised of a bracket secured to the frame member adjacent said tubular spacer means end and a bolt threadably disposed in said bracket, said bolt being in abutment with said lever whereby turning said bolt will angularly displace said lever and impart a torsional force to said tubular spacer means.

16. The apparatus in accordance with claim 15 wherein said means to secure said tubular spacer means to the adjacent frame member comprises a first plate integral with said tubular spacer means end, a second plate integral with said adjacent frame member, and a plurality of bolts extending through and clamping together both said first and second plates.

17. The apparatus in accordance with claim 14 wherein both of said spacer means are tubular and each includes an integrally secured, radially extending member at one end thereof, port and starboard adjustment means mounted on the frame members adjacent said spacer means ends, said adjustment means being arranged to angularly displace said radially extending members and means to secure said spacer means ends to the adjacent frame members subsequent to the angular displacement of said radially extending members.

18. The apparatus in accordance with claim 17 wherein said radially extending members are levers and wherein said adjustment means are comprised of port and starboard brackets secured to the respective frame members adjacent said spacer means ends and a bolt threadably disposed in each of said brackets, said bolts being in abutment with said respective levers whereby turning said bolts will angularly displace said levers and impart a torsional force to each of said spacer means.

19. The apparatus in accordance with claim 18 wherein said means to secure said spacer means to the adjacent frame members comprises a first plate integral with each said spacer means end, a second plate integral with each of the adjacent frame members and a plurality of bolts extending through and clamping together both said respective first and second plates.

20. In a mobile hoist characterized by open framework, including a power plant and port and starboard beam members extending between the fore and aft ends of the hoist, improved load-manipulating means comprising:

(a) power divider secured to one of the beam members;

(b) means to drivingly interconnect the power plant and said power divider;

(c) first and second drive shafts extending from and rotatably driven by said power divider, one of said drive shafts terminating proximate the fore end of the hoist, the other of said drive shafts terminating proximate the aft end of the hoist;

(d) linkage means connected to said power divider and arranged to select either of said first and second drive shafts for rotation by the power plant;

(e) fore and aft right angle drive means connected to the ends of said respective drive shafts;

(f) fore and aft winches each having port and starboard drums, said winches being mounted on one of the beam members;

(g) means to drivingly interconnect said respective drive shafts and winches;

(h) lengths of port and starboard cables wound about said respective port and starboard drums of said fore and aft winches; and (i) fore and aft slings secured respectively to the port and starboard sides of said fore and aft winch cables.

21. The apparatus in accordance with claim 20 including brake means integral with each of said winches.

22. The apparatus in accordance with claim 20 including elongated port and starboard hanger tubes secured respectively to said port and starboard cables of said fore and aft winches, said port and starboard sides of said fore and aft slings being secured to said port and starboard hanger tubes.

23. The apparatus in accordance with claim 20 wherein said fore and aft slings are slidably adjustable along the length of said fore and aft hanger tubes.

References Cited
UNITED STATES PATENTS

| | | | |
|---|---|---|---|
| 2,223,863 | 12/1946 | Wunsch | 212—38 |
| 3,075,603 | 1/1963 | Baudhuin | 214—394 |
| 3,181,717 | 5/1965 | Kumferman | 214—394 |
| 3,247,975 | 4/1966 | Holt | 212—6 |

EVON C. BLUNK, *Primary Examiner.*

H. C. HORNSBY, *Assistant Examiner.*